United States Patent
Colligan

(10) Patent No.: US 8,225,035 B2
(45) Date of Patent: Jul. 17, 2012

(54) SYSTEMS AND METHODS FOR OPERATING A DISK DRIVE

(75) Inventor: Thomas R. Colligan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 466 days.

(21) Appl. No.: 12/427,383

(22) Filed: Apr. 21, 2009

(65) Prior Publication Data

US 2010/0268866 A1    Oct. 21, 2010

(51) Int. Cl.
*G06F 13/00* (2006.01)

(52) U.S. Cl. .................. 711/112; 711/103; 711/118

(58) Field of Classification Search .......... 711/112, 711/103, 118
See application file for complete search history.

(56) References Cited

U.S. PATENT DOCUMENTS

| | | |
|---|---|---|
| 5,341,255 A | 8/1994 | Starr et al. |
| 5,940,238 A | 8/1999 | Nayak et al. |
| 6,604,223 B1 | 8/2003 | Bilser et al. |
| 7,373,438 B1 * | 5/2008 | DeBergalis et al. ............ 710/40 |
| 7,870,172 B1 * | 1/2011 | Sarma ............................ 707/822 |
| 2005/0216668 A1 * | 9/2005 | Kobayashi et al. ........... 711/118 |
| 2007/0074083 A1 | 3/2007 | Olds et al. |
| 2007/0174736 A1 * | 7/2007 | Yoshida ........................... 714/53 |
| 2008/0098040 A1 * | 4/2008 | Xie ................................ 707/201 |
| 2009/0193178 A1 * | 7/2009 | Warren et al. ................. 711/103 |

OTHER PUBLICATIONS

I. Koltsidas, et al.; "Flashing Up the Storage Layer," VLDB '08, Aug. 24-30, 2008, Auckland, New Zealand, 12 pgs.

* cited by examiner

*Primary Examiner* — Huan Hoang
(74) *Attorney, Agent, or Firm* — Fletcher Yoder PC

(57) ABSTRACT

System and methods for storing data to a storage device are provided. In embodiments, the storage device may include a disk drive with a solid-state memory for storing certain frequently updated information. In some embodiments, the solid-state memory may be used to store journaling information.

9 Claims, 4 Drawing Sheets

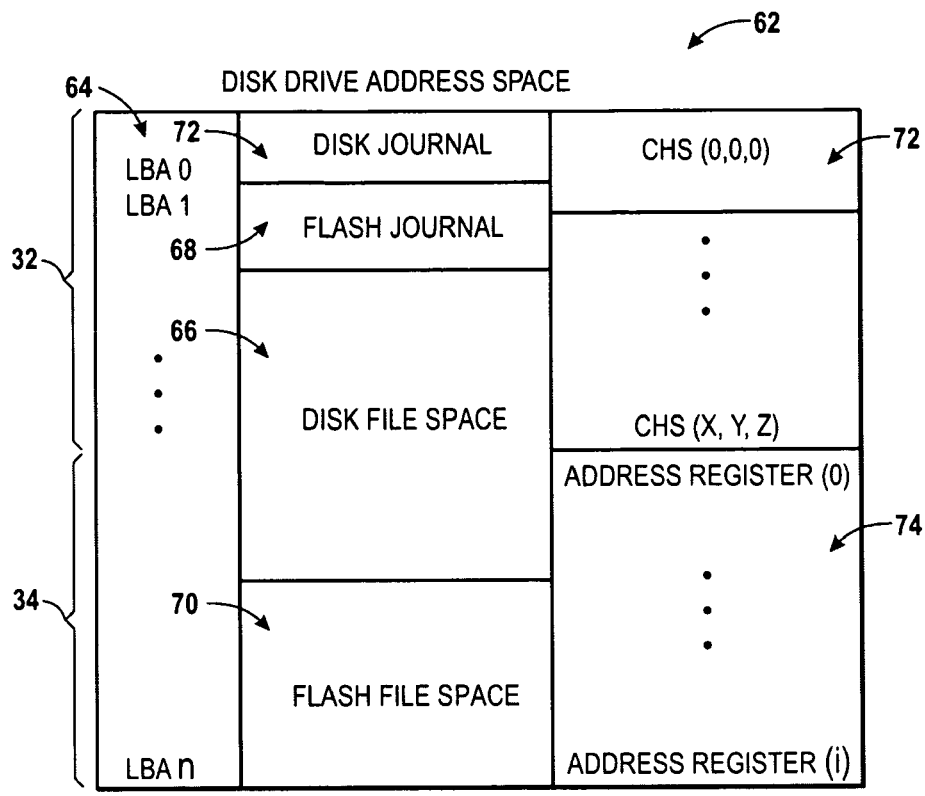
FIG. 4
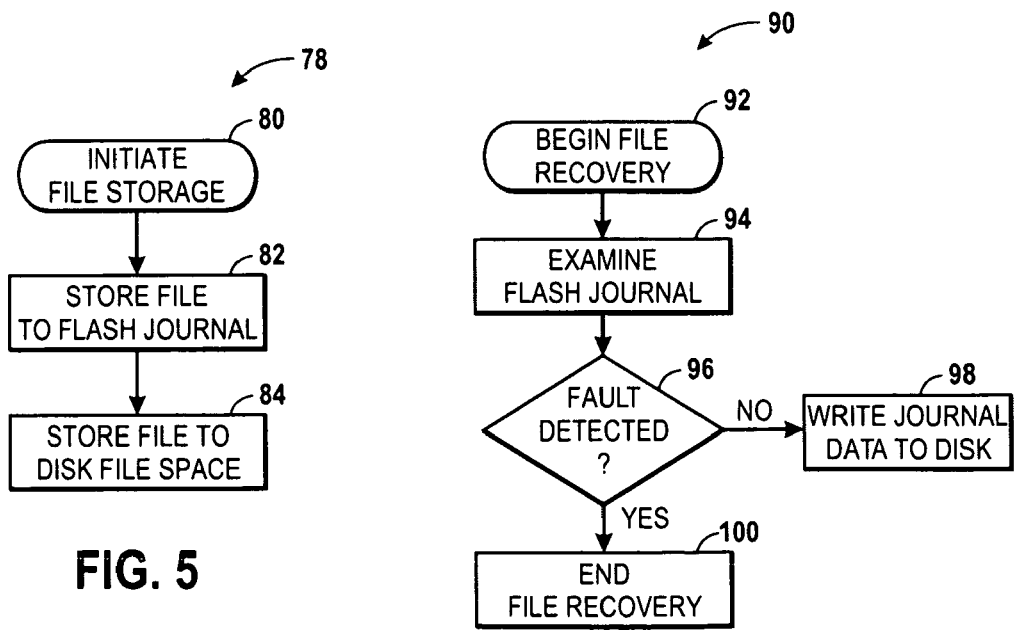
FIG. 5
FIG. 6

SYSTEMS AND METHODS FOR OPERATING A DISK DRIVE

BACKGROUND

The present disclosure relates generally to electronic devices and, more specifically, to systems and methods for storing electronic data to a file storage device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Hard disk drives continue to be one of the most widely used electronic storage mediums. Typically, a hard drive stores electronic data by storing a series of magnetic polarity transitions in circular tracks along the surface a magnetic disk. As disk drive technology has advanced, the amount of data that may be stored on a disk has greatly increased, in part, by increasing the density of the tracks. With increased track density, however, the risk of data corruption through adjacent track interference, often referred to as ATI, and wide area adjacent track erasure, often referred to as ATE, also increases.

Adjacent track interference occurs during write operations when the fringing magnetic field of the head weakens the magnetic polarity transitions on tracks adjacent to the track being written. Over time, after successive write operations to a particular track, the data stored on the adjacent tracks may weaken to the point of becoming unreadable, resulting in corruption of the file and loss of data. Wide area adjacent track erasure poses a similar problem. In a typical perpendicular recording design, a soft underlayer is used in the media as part of the flux return path to enhance the write field, and a shield is added next to the write pole in the write head to increase the write field gradient. Unfortunately, the shield leads to an additional flux path, and the write coil induces flux through this additional path during writing, often resulting in adjacent track erasure. Given the large footprint of these shields, the erasure can occur over a fairly wide span, thus rendering the term wide area adjacent track erasure. Accordingly, modern disk drives often include correction algorithms designed to reduce the effects of ATI and ATE by periodically refreshing data before the data becomes unreadable. The refreshing process may involve reading particular tracks and re-writing the data in those tracks. These correction algorithms, however, may tend to reduce the performance of the hard drive by reducing the hard drive's availability while the correction algorithms execute.

To increase the efficiency of data correction algorithms, the algorithms may tend to target tracks that are in high traffic areas, i.e., areas of the disk that have experienced more write operations and, therefore, potentially higher levels of ATI and/or ATE. For example, the disk drive may keep a record of the number of write operations that each track has experienced, and when a particular track has experienced a threshold number of writes, the data correction algorithm may then be executed to refresh the adjacent tracks. It will be appreciated, therefore, that high traffic areas of the disk will tend to cause the initiation of data correction algorithms more frequently.

One area of the disk that may experience particularly high traffic is the journaling area of the disk, which is used by the operating system's journaling file system. A journaling file system is used to reduce the likelihood of file corruption in the event of a system crash during the writing of file data to the disk drive. In a journaling file system, changes are written to or logged into a journal, which is usually contained in a reserved space on the hard drive, before the changes are committed to the main file system. A journaling file system maintains a journal of the changes it intends to make ahead of time, so that after crash the recovery simply involves replaying changes from the journal until the file system is consistent. To increase the average speed of file storage, the space on the disk drive that is reserved for the journal is usually toward the outer circumference of the disk, where the data processing speed is faster. This process provides the advantage that, in the event of a system crash during a file update, at least one uncorrupted version of the file will exist.

Due to the fact that the journal is written during every write operation to the disk, the journal will usually be a very high traffic area. As a high traffic area, the journal may tend to experience more ATI and/or ATE, and as a result, the data correction algorithms may tend to be initiated more often for the journal area compared to other areas of the disk.

SUMMARY

A summary of certain embodiments disclosed herein are set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain disclosed embodiments provide a disk drive with a solid state memory, such as a flash memory, wherein the flash memory may be used to store frequently updated information, such as a database or journaling information. Storing the frequently updated information to the flash memory rather than to the disk may result in more efficient use of the disk drive. For example, storing the journaling information to the flash memory instead of the disk may eliminate a particularly high traffic area from the disk, resulting in fewer executions of the correction algorithms, which would otherwise consume disk drive resources. For another example, moving the journal off the disk drive frees up more space on the disk drive for regular file storage. Additionally, the disk space made available by the absence of the journal may include the higher speed memory at the outer tracks of the disk. In some embodiments, the journal may be stored to both the flash memory and the disk drive. In this way, the reliability of the drive may be improved by providing a second redundant journal. In this embodiment, the redundant journal may be saved toward the center of the disk, thus reserving the higher speed outer tracks for regular file storage. Furthermore, information stored in the solid state memory, e.g., the flash memory, may be moved to the disk in response to a sleep event and returned to the flash memory in response to a wake event.

BRIEF DESCRIPTION OF THE DRAWINGS

Various aspects of this disclosure may be better understood upon reading the following detailed description and upon reference to the drawings in which:

FIG. 4 is a chart illustrating an example of a memory map of the disk drive of FIG. 1, in accordance with embodiments of the present technique;

FIG. 5 is a flow chart illustrating a method of using the disk drive of FIG. 1 to store journaling information, in accordance with embodiments of the present technique;

FIG. 6 is a flow chart illustrating a method of recovering journaling information from the disk drive of FIG. 1, in accordance with embodiments of the present technique;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
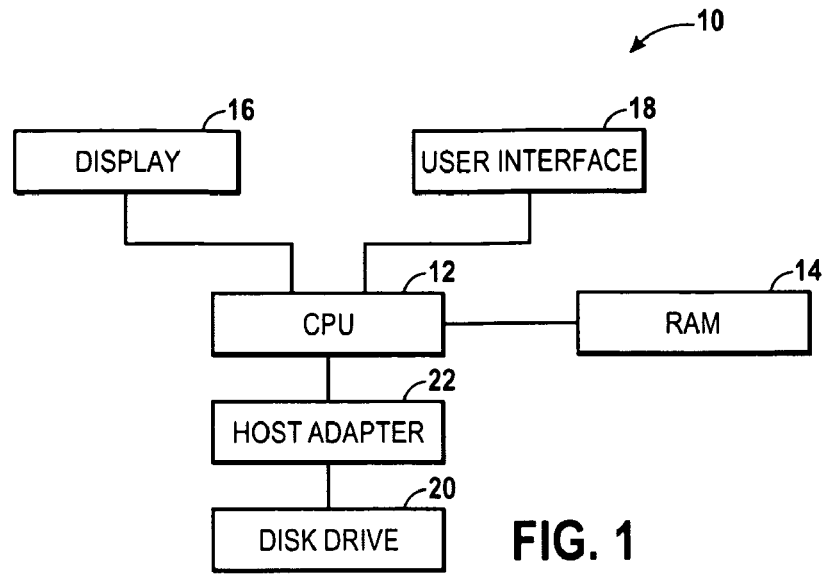
FIG. 1 is a block diagram of an electronic device 10 with an example of a disk drive in accordance with embodiments of the present technique.

Turning to the figures, FIG. 1 illustrates electronic device 10 in accordance with embodiments of the present technique. As shown in FIG. 1, electronic device 10 may include central processing unit (CPU) 12 communicatively coupled to random access memory (RAM) 14, display 16, and/or user interface 18. In some embodiments, electronic device 10 may be a general purpose computer, such as a Macintosh personal computer available from Apple, Inc. in Cupertino, Calif. In other embodiments, electronic device 10 may be any electronic device that includes a disk drive, such as digital video recorder (DVR), for example.

CPU 12 may be any general purpose microprocessor known in the art, and may also be, for example, an application-specific integrated circuit (ASIC), reduced instruction set processor (RISC), or programmable logic controller (PLC). CPU 12 may run the operating system of electronic device 10 and may manage the various functions of electronic device 10, such as writing to or reading from various data storage devices, for example. In some embodiments, CPU 12 may use journaling file system, as will be explained further below. RAM 14 may include any type of random access memory (RAM), such as dynamic RAM (DRAM) or static RAM (SRAM), for example. RAM 14 may hold various applications, algorithms, and/or files used in the operation of electronic device 10. RAM 14 may also include memory controller that controls the flow of data to and from RAM 14. In embodiments, RAM 14 may be used to temporarily hold files that have been uploaded from storage memory.

Display 16 may be any suitable type of video display device, such as, computer monitor, LCD screen, or cathode ray tube (CRT) display, for example. In some embodiments, display 16 may be included within electronic device 10. In other embodiments, however, display 16 may be an external device coupled to electronic device 10 through a data transfer medium such as HDMI or VGA interface, for example. User interface 18 may include a variety of user interface tools such as, for example, buttons, knobs, touch screens, trackballs, keyboard, mouse or any other suitable user interface.

Also included in electronic device 10 is disk drive 20, which may be communicatively coupled to CPU 12 through host adapter 22. Host adapter 22 may serve as a communications interface between CPU 12 and disk drive 20. Accordingly, CPU 12 may access disk drive 20 by sending suitable instructions to host adapter 22. Host adapter 22 may then issue corresponding commands to disk drive 20 in a format recognized by disk drive 20. In response to the commands from host adapter 22, disk drive 20 may then write a file to or read a file from the storage memory of disk drive 20. In the case of a file request, disk drive 20 may read the requested file and send the requested file back to host adapter 22, which then sends the file to CPU in a format recognized by CPU 12.

Disk drive 20 may be, for example, a SCSI, SAS, ATA (IDE), or SATA compatible hard disk drive, and may be used for non-volatile storage of files, such as the operating software used by electronic device 10, software applications, video and audio files, pictures, user-generated documents, etc. As will be explained further below, with reference to FIGS. 2-4, disk drive 20 may include a non-volatile RAM, such as flash memory, for storing some files, such as journaling information generated by the journaling file system running on CPU 12.

Figure 2:
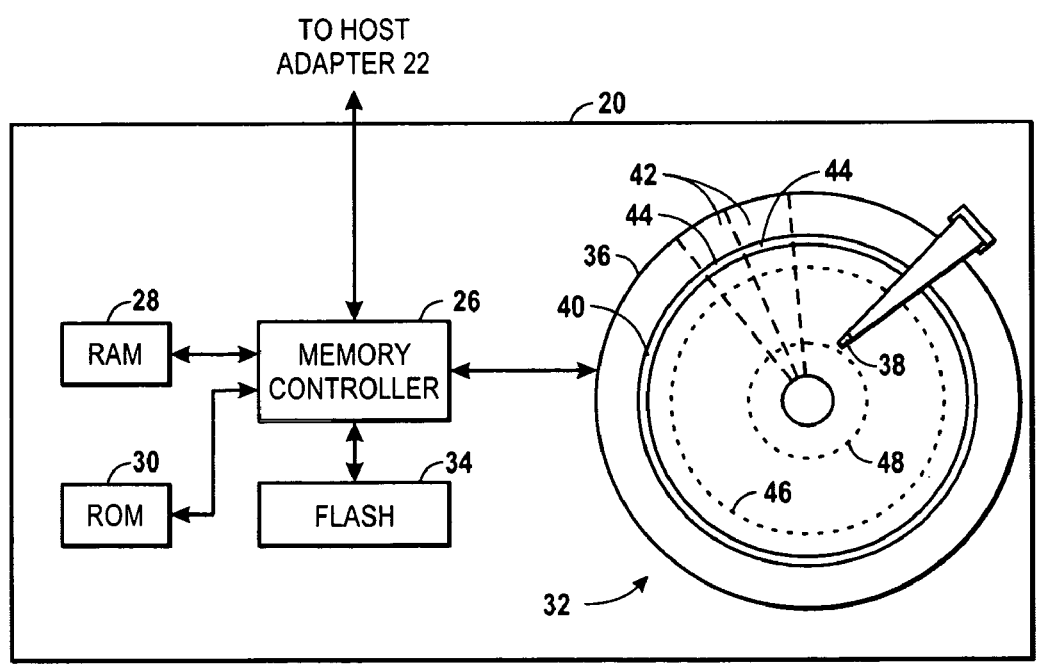
FIG. 2 is a diagram of the disk drive of FIG. 1, in accordance with embodiments of the present technique.

Turning now to FIG. 2, a block diagram of disk drive 20 of FIG. 1 is shown in accordance with embodiments of the present technique. Included in disk drive 20 is memory controller 26, random access memory (RAM) 28, and read-only memory (ROM) 30. Memory controller 26 controls the basic operation of disk drive 20. For example, memory controller 26 receives instructions from host adapter 22 and writes to or reads from the storage memory of disk drive 20 based on the instructions from host adapter 22, as will be explained further below in reference to FIG. 3.

RAM 28 may include any suitable volatile memory, such as DRAM, for example, and may be used to temporarily save file data that is being written to or read from disk drive 20. In this way, RAM 28 may act as a buffer between memory controller 26 and host adapter 22. ROM 30 may include any suitable non-volatile memory, such as EPROM and EEPROM, and may be used to store the firmware of disk drive 20. ROM 30 may also be used to store various operating parameters that may identify the capabilities of disk drive 20, such as the amount of flash and/or disk memory available, for example.

Disk drive 20 may store some file data on magnetic disk 32. Disk 32 may include a magnetic storage media, known as "platter" 36. Information may be transferred to or from platter 36 by movable head 38 that is suspended adjacent to the surface of platter 36. Files may be stored on platter 36 in several tracks 40, which are concentric rings on the outer surface of platter 36. Each track 40 may be further divided into sectors 42, which are portions of individual tracks 40. The intersection of sectors 42 and tracks 40 are known as "blocks" 44, which represent the smallest unit of data (typically around a few hundred kilobytes) that may be read from platter 36 at a time. During a write operation, head 38 is disposed adjacent to a designated track 40 as platter 36 rotates, and head 38 generates a magnetic field that creates a series of magnetic polarity transitions along track 40 representing a series of logical ones and zeroes. During a read operation, head 38 is disposed adjacent to a designated track 40 as platter 36 rotates, and head 38 detects the polarity transitions stored thereon.

In some embodiments, disk 32 may include several platters 36 and/or each platter 36 may be double sided so that data may be stored on both sides of platter 36. As such, each side of each platter 36 may be disposed adjacent to a different head 38. In this way, several tracks 40 may be read simultaneously as platters 36 rotate. Together, the correlative tracks 40 on different platters 36 and on different sides on the same platter 36 form what are known a "cylinders." In such embodiments, each memory block 44 on disk 32 may be given a unique cylinder-head-sector (CHS) designation corresponding to the location of block 44 on the one or more platters 36.

Each platter 36 may be thought of as including outer portion 46 toward the outer edge of platter 36 and inner portion 48 toward the center of platter 36. Disk drive 20 may be able to read and write tracks 40 in the outer portions 46 of platters 36 faster than tracks 40 in the inner portions 48 of platter 36. This is true because data may be written to and read from platter 36 at the same rotational velocity regardless of which track 40 is being accessed, and because the outermost tracks 40 are larger in circumference and, therefore, hold more data. Thus, the larger amount of data contained in the outer tracks is processed just as quickly as the smaller amount of data contained in the inner tracks. In some embodiments, an outer portion 46 of platter 36 may be used for regular file storage and inner portion 48 of platter 36 may be used for storing backup files, such as backup journaling information.

It will be appreciated that during a write operation, a fringing magnetic field from head 38 and/or the associated shields may tend to affect adjacent tracks, as discussed above regarding ATI and ATE. After successive write operations to a particular track, the cumulative effects of ATI and/or ATE on the adjacent tracks may cause the data on those tracks to be corrupted. Therefore, to reduce these effects, the memory controller 26 may perform one or more correction algorithms to reduce the likelihood of data corruption. The execution of the correction algorithm(s) may be related to the number of times that particular tracks have been written. During execution of the correction algorithm, disk 32 may become temporarily unavailable for the purpose of writing or reading new file data to or from the disk drive. Therefore, running the correction algorithm may cause some delay in accessing the memory of disk drive 20. Embodiments of the present technique may reduce the delay caused by the correction algorithm by storing certain information to a memory, such as flash memory 34, rather than disk 32, thereby reducing the number of times that the correction algorithm is executed.

Flash memory 34 may include any suitable kind of non-volatile random access memory, such as NAND flash or NOR flash, for example. Additionally, flash memory 34 may be single-level cell (SLC) flash, which stores one bit of information per memory cell, or multi-level cell (MLC) flash, which stores two or more bits of information per memory cell. In some embodiments, flash memory 34 may be used to store the firmware used by disk drive 20, in which case ROM 30 may not be present. Moreover, flash memory 34 may be used to store certain "high traffic" information (i.e., information that is frequently re-written) such as a database or the journaling information generated by the file system running on CPU 12. By storing high traffic information on flash memory 34 rather than disk 32, the number of write operations performed on disk 32 may be reduced, which may result in fewer executions of the correction algorithm.

To determine which files are stored on flash memory 34 and which files are stored on disk 32, the file system running on CPU 12 may, in some embodiments, receive information from disk drive 20 regarding the memory specifications of drive 20. The memory specifications may be stored in flash memory 34 or ROM 30, for example, and may serve to alert CPU 12 that disk drive 20 includes a flash memory capable of storing file data. Additionally, the memory specifications may also inform CPU 12 regarding how much memory space is available on disk 32 and how much is available on flash memory 34. The file system CPU 12 may then organize the available memory, as will be described further below, in reference to FIG. 4.

Figure 3:
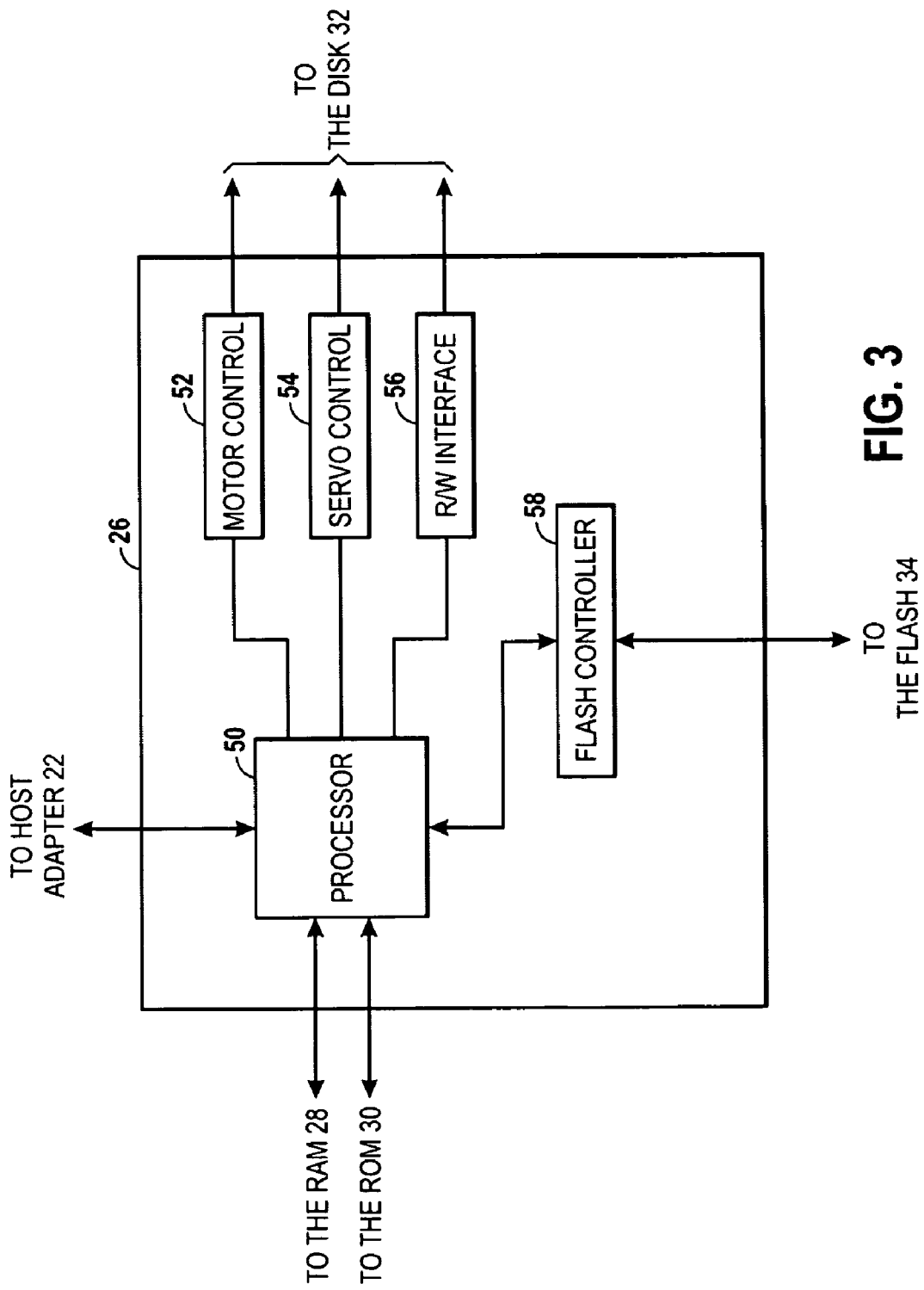
FIG. 3. is a block diagram of an example of a memory controller included in the disk drive of FIG. 1, in accordance with embodiments of the present technique.

Turning now to FIG. 3, a more detailed block diagram of memory controller 26 of FIG. 2 is shown in accordance with embodiments of the present technique. As shown in FIG. 3, memory controller 26 may include processor 50, which receives commands from host adapter 22 and performs the requested actions. Accordingly, processor 50 may distinguish between data stored on disk 32 and data stored on flash 34. In some embodiments, which will be discussed further below, the file system of CPU 12 does not explicitly specify whether to access flash memory or disk memory during file storage and retrieval. Rather, as will be explained further below with reference to FIG. 4, CPU 12 simply specifies a particular memory location, and processor 50 determines whether the specified memory location exists on disk 36 or flash memory 34.

If CPU 12 specifies a memory location on disk 32, processor 50 issues commands to the hardware that controls disk 32. For example, processor 50 may issue commands to motor control 52, which controls the spinning of disk 32, and servo control 54, which controls the position of head 38 relative to platters 36. Processor 50 may then send data to disk 32 or receive data from disk 32 through read/write interface 56. Read/write interface 56 may include circuitry suitable for converting a digital signal from processor 50 into a magnetic field generated by head 38, such as digital-to-analog converters and amplifiers, for example. Read/write interface 56 may also include circuitry suitable for converting the magnetic signal received by head 38 into a digital signal that may be sent to processor 50, such as analog-to-digital converters, amplifiers, filters, etc.

If, however, CPU 12 specifies a location in flash memory 34, processor 50 may issue commands to flash controller 58 that interfaces with flash memory 34. For example, flash controller 58 may send a memory address to flash 34 along with a data request or data to be written. In some embodiments, processor 50 may also run a wear-leveling algorithm that spreads the write operations equally across flash memory 34. For example, memory controller 26 may periodically re-map flash memory 34 so that most or all of the flash memory 34 blocks undergo substantially the same number of write operations. As will also be discussed further below, flash memory 34 may, in some embodiments, be used exclusively for the journaling information used by the operating system's file system. In these embodiments, flash memory 34 may be written evenly by utilizing a log-structured file system, wherein the journal is written sequentially to a circular log. In other embodiments, flash memory 34 may also be used to store other files, particularly files that may be frequently updated.

Turning now to FIG. 4, a chart illustrating an example of a memory map of disk drive 20 is shown in accordance with embodiments of the present technique. As mentioned above, the organization of the memory on disk drive 20 may be determined, in part, by the file system running on CPU 12, and, in part, by memory controller 26. As shown in FIG. 4, CPU 12 may organize the memory of disk drive 20 as a contiguous range of logical block addresses (LBAs) 64 corresponding to both disk 32 and flash 34. Firmware running on memory controller 26 may map LBAs 64 to physical memory address spaces corresponding to disk 32 and flash 34. Accordingly, the file system and other applications running on CPU 12 may access disk 32 and flash memory 34 by using the same set of commands but specifying different LBAs 64. Furthermore, once the file system maps disk drive 20 memory, the memory map will be persistent over power cycles to ensure that important file data, such as the journaling data is not lost due to a power failure or a system crash.

As shown in FIG. 4, the file system may reserve a block of memory on disk 32 for file storage, designated in FIG. 4 as "disk file space" 66. Disk file space 66 may be used to store data files as well as certain information related to the arrangement of the files on the disk, such as directory information, file names, file properties, file and directory locations, etc. Additionally, the file system may also reserve a block of memory on flash 34 for journaling information, designated in FIG. 4 as "flash journal" 68. The memory mapped to flash journal 68 may be fixed or dynamic. Furthermore, in some embodiments, the file system may reserve a block of memory on flash 34 for file storage, designated in FIG. 4 as "flash file space" 70. Flash file space 70 may be used to store any other data files, including files that may be updated frequently, such as databases. In some embodiments, the file system may also reserve a block of memory on disk 32 for backup of journaling information, designated in FIG. 4 as "disk journal" 72. Disk journal 72 may be used as a duplicate record of the journaling information stored on flash 34, as will be explained further below.

Once the memory addresses of disk drive 20 have been mapped, file system, operating system, and other applications running on CPU 12 may not differentiate between storage space on disk 32 and storage space on flash 34. In other words, in the ordinary course of saving or retrieving a particular file, CPU 12 may not specify whether the particular file is located in flash memory 34 or disk 32. Rather, CPU 12 would only specify the LBA corresponding to the particular file. In this sense the accessing of flash 34 and disk 32 may be transparent to the applications running on CPU 12. Accordingly, memory controller 26 may perform the task of determining whether a file exists on disk 32 or flash 34. As such, memory controller 26 may associate one range of LBAs with disk 32 and another range of LBAs with flash 34.

To issue a read or write command to memory controller 26, CPU 12 may provide an LBA corresponding to a memory block located on disk drive 20. In response, memory controller 26 may determine whether the indicated memory block is located on disk 32 or flash 34 and issue corresponding instructions to disk 32 or flash memory 34, accordingly. For example, if CPU 12 requests a file from an LBA corresponding with disk 32, memory controller 26 will translate the LBA into CHS coordinate 72 corresponding to the appropriate block 44 on disk 32 and issue commands to motor control 52, servo control 54, and read-write interface 50 suitable for retrieving the requested file. If, however, CPU 12 requests a file from an LBA corresponding with flash 34, memory controller 26 will translate the LBA into an address register 74 corresponding to the appropriate block 44 on flash 34 and issue commands to flash controller 58 suitable for retrieving the requested file from flash 34.

Figure 7:
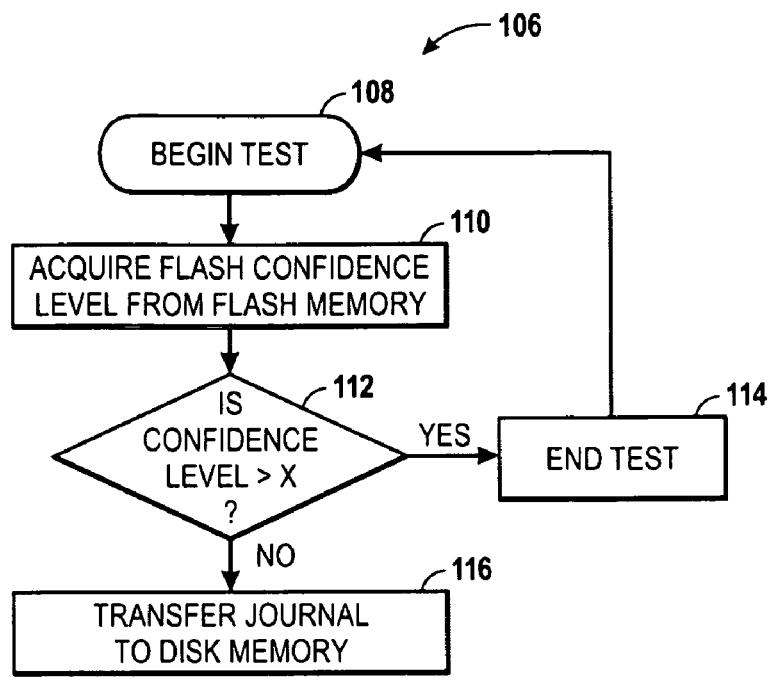
FIG. 7 is a flow chart illustrating a method of transferring journaling information from a flash memory of the disk drive of FIG. 1, in accordance with embodiments of the present technique.

Electronic device 10 described above may provide several advantages. Specifically, electronic device 10 may enable various methods of storing frequently accessed data in a way that is faster and more reliable. For example, in certain embodiments, the journaling information used by the file system may be stored to flash memory 34 rather than disk 32, resulting in fewer writes to disk 32 and fewer executions of the ATI correction algorithms. FIGS. 5-7 illustrate various methods of using the electronic device to store and retrieve journaling information.

Turning first to FIG. 5, a method of saving data to a journal in a journaling file system is shown in accordance with embodiments. As stated above, in some embodiments, journaling file data may be stored to both flash journal 68 and redundant disk journal 72. Method 78 may start at step 80 wherein an application running on CPU 12 initiates the storage of a file or a file update such as a new application, an operating system update, etc. In some cases, the file may be a user document such as a picture file, text document etc., and the storage may be initiated by a user.

Upon initiation of method 78, the file system may update flash journal 68 by writing the journaling information to flash journal 68 at step 82. In some embodiments, the journaling information may include an exact copy of the file to be stored. However, in some embodiments, the journal information may include file meta-data, i.e., a list of instructions corresponding with changes to be made to disk file space 66. A complete copy of the journaling information also may be stored on drive 20 in flash memory 34. At step 84, the file system may store the file to disk file space 66. At this point, assuming that the save operation has not been interrupted by a loss of power or a system crash, the file has been safely stored to the disk file space 66, without introducing any corrupted data structures.

Flash journal 68 may be sufficient, in most cases, to ensure the integrity of file data stored on disk drive 20. However, is some embodiments, the journaling information may also be written to disk journal 72. The journaling information saved to disk journal 72 may serve as a backup copy in the event that the file stored in both flash journal 68 and disk file space 66 is somehow corrupted. In some embodiments, the file data may be written to both the flash journal and the disk journal simultaneously. Alternatively, due to low probably of both flash journal 68 and disk file space 66 being corrupted, the saving of journaling data to disk journal 72 may be given a low priority. Accordingly, the writing of the file data to disk journal 72 may be conducted during a time when disk drive 20 is otherwise idle. In this way, the length of time used in writing information to disk drive 20 may be reduced. In some embodiments, the file data may be stored in RAM 28 of disk drive 28 until such time that the file data may be written to disk journal 72. Alternatively, disk journal 72 may be periodically updated directly from flash journal 68 during disk drive 20 idle time.

There may be other instances as well when it is desirable to write information from the flash journal to the disk journal, and vice versa. For example, as part of the process of placing the electronic device into a sleep state, information from the flash journal 68 may be stored in the disk journal 72. This will ensure that the journal information is maintained during the sleep state. As part of the wake event, the information stored on the disk journal 72 may then be re-written to the flash journal 68 so that the device may operate as discussed above and realize the attending advantages.

Turning now to FIG. 6, a method of recovering file information from a flash journal is shown in accordance with embodiments. The method 90 of restoring file information may begin at step 92, which may be initiated by the operating system after an improper shut down of electronic device 10, such as a system crash or a power failure. Upon the initiation of a file recovery at step 92, method 90 may advance to step 94, wherein flash journal 68 is examined for faults in the data structure of flash journal 68. Next, at step 96, method 90 branches depending on whether a fault was detected in flash journal 68.

If a fault is not detected in flash journal 68, this indicates that the journaling information in flash journal 68 contains the latest, uncorrupted version of the disk file space. Accordingly, if no fault is detected, method 90 branches to step 98, wherein the journal may be "replayed." In other words, the data file, as represented in flash journal 68, may be re-written to disk file space 66. If, however, a fault is detected in flash journal 68, this may indicate that the file storage process (e.g., method 78 of FIG. 5) was interrupted due to a system failure or power outage. Accordingly, if a fault is detected, the method branches from step 96 to step 100, wherein the file recovery method ends. In other words, the journal is not replayed to disk file space 66. In this case, any files or file updates that were being written to the journal at the time of the system failure may be lost, but the disk file space will not be corrupted.

Turning now to FIG. 7, a method of transferring a journal from the flash memory 34 to the disk 32 is shown. As will be appreciated by a person of ordinary skill in the art, many kinds of flash memory may have a limit to the number of write operations that may be applied to individual memory blocks. Therefore, flash memory 34 may eventually become unsuitable for storage of the journaling information. Accordingly, in certain embodiments electronic device 10 may discontinue the use of flash memory 34 for storage of journaling information if flash memory 34 becomes potentially unreliable. As shown in FIG. 7, method 106 may perform a test of flash memory 34 to determine whether it should continue to be used for the journal.

Method 106 starts at step 108, in which a test of flash memory 34 is initiated to determine its level of reliability. After initiation of the test, method 106 advances to step 110, wherein a confidence level for flash memory 34 is acquired. The confidence level may be based on the number of write operations that have been performed for individual memory blocks of flash memory 34. For example, the confidence level may be based on the memory block that has experienced the greatest number of write operations, or the confidence level may be based on an average number of write operations for the entire flash memory. For another example, the confidence level may be based on a cumulative operating time of disk drive 20 over the life of disk drive 20.

Furthermore, the confidence level may be calculated based on information stored in a log configured to record the number of write operations applied to flash memory 34. For example, each time data is written to a memory block of flash 34, processor 50 of memory controller 26 may increment an indicator associated with the particular memory block. Such an indictor may be stored for each memory block within a log. The log may be stored in any persistent memory associated with disk drive 20, such as disk 32 or flash memory 34. To acquire the confidence level, therefore, processor 50 may retrieve the indicators from the log to calculate the confidence level. After determining the confidence level for flash memory 34, method 106 may advance to step 112.

At step 12 it is determined whether the confidence level is above a specified threshold, "x". For example, the threshold may be based on a number of write operations beyond which flash memory 34 would be expected to become unreliable. If the confidence level is above the acceptable threshold, the method advances to step 114, wherein the test is ended and no changes are made regarding the use of flash memory 34. In this case, the test of the flash memory may be repeated at a later time. For example, the test may be repeated after the passage of a specified amount of time or after a specified number of file storage operations have been performed on disk drive 20. If the confidence level is below the specified threshold, however, method 106 advances to step 116.

At step 116, the journaling function may be transferred to disk 32. Transferring the journaling function means that future journaling information will be stored to disk 32 rather than flash memory 34. Furthermore, the existing journaling information may also be transferred from flash memory 34 to disk 32. In some embodiments, the journaling function may be transferred to a reserved space on disk 32, such as disk journal 72, as shown in FIG. 4. Furthermore, disk journal 72 may be re-mapped to outer portion 46 (see FIG. 2) of disk 32 to make use of the higher processing speed available on outer portion 46 of disk 32.

In some embodiments, the journaling function may be transferred to disk 32 by the file system running on CPU 12. In this case, memory controller 26 may, at step 116, send an indicator to CPU 12, indicating that disk drive 20 no longer supports flash journaling. In response, the file system running on CPU 12 may designate a range of LBA's corresponding with disk 32 for storage of journaling information. In other embodiments, however, the journaling function may be transferred to disk 32 by memory controller 26. In this case, memory controller 26 may, at step 116, remap the LBAs associated with the journal to a new set of physical memory addresses. In this way, the file system running on CPU 12 may continue to use the same LBAs for storing journal information. After transferring the journal function to disk 32, method 106 terminates and flash memory 34 is no longer be used.

Figure 8:
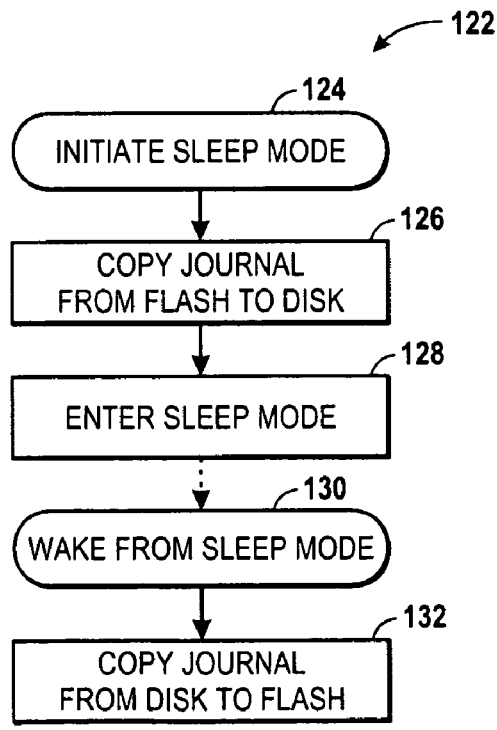
FIG. 8 is a flow chart illustrating a method of backing up the journaling information on the disk drive of FIG. 1, in accordance with embodiments of the present technique.

Turning now to FIG. 8, a method of backing up the journaling information to disk 32 is shown. Method 122 starts at step 124, wherein the electronic device 10 initiates a sleep mode. The sleep mode may be a mode of operation wherein electronic device 10 disables some portion of its circuitry, in order to conserve power. In various embodiments, the sleep mode may be initiated by a user or the sleep mode may be triggered in response to a low battery condition, for example. During the initiation of sleep mode, CPU 12 may send a signal to disk drive 20 indicating that CPU 12 will be powering down disk drive 20, thus enabling disk drive 20 to prepare for sleep mode. After initiating sleep mode, method 122 will advance to step 126, wherein the journal information is copied from flash memory 34 to disk 32. In some embodiments, the flash journal may be copied to a reserved space on disk 32 such as disk journal 72 (FIG. 4). Furthermore, in some embodiments, the operating system running on CPU 12 may perform the task of copying the journal to disk 32; whereas, in other embodiments, memory controller 26 may copy the journal from flash 34 to disk 32 directly, i.e., without involvement of CPU 12. In this way, CPU 12 may be free to perform other task in preparation for the start of sleep mode.

After some passage of time, method 122 may advance to step 128, wherein electronic device 10 awakes from sleep mode and resumes normal operation. After waking from sleep mode, method 122 may advance to step 130, wherein the journal is copied from disk 32 back to flash memory 32. After the journal is copied from disk 32 back to flash memory 34, disk drive 20 may resume normal operation The methods and systems described above may provide several advantages. For example, by storing the journaling information to the flash drive 34 rather then the disk 32, the number of write operations to the disk 32 may be greatly reduced, resulting in fewer executions of the ATI correction algorithm. Reducing the number of executions of the ATI correction algorithm may result in power savings and faster data storage. Additionally, storing the journaling information on the disk enables the higher speed outer portions 46 of the disk 32 to be used for regular file storage. Furthermore, the reliability of the information stored in the journal may be improved by storing the journal to both a flash memory and a redundant disk memory.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A disk drive, comprising:
a magnetic disk;
a flash memory; and
a memory controller communicatively coupled to the magnetic disk and the flash memory, the memory controller configured to receive file information from a host processor and store the file information on the magnetic disk or the flash memory based at least in part on whether the file information is updated frequently, wherein the memory controller is configured to perform an adjacent track interference correction algorithm that periodically refreshes data stored on the magnetic disk.

2. The disk drive of claim 1, wherein the file information updated frequently comprises database information.

3. The disk drive of claim 1, wherein the file information updated frequently comprises journaling information.

4. A disk drive, comprising:
a magnetic disk;
a flash memory; and
a memory controller communicatively coupled to the magnetic disk and the flash memory, the memory controller configured to receive file information from a host processor and store the file information on the magnetic disk or the flash memory based at least in part on whether the file information is updated frequently, wherein the memory controller is configured to perform a wear-leveling algorithm that distributes write operations substantially evenly across a memory address space corresponding with the flash memory.

5. The disk drive of claim 4, wherein the file information updated frequently comprises database information.

6. The disk drive of claim 4, wherein the file information updated frequently comprises journaling information.

7. A method of operating a disk drive, comprising:
storing journaling information corresponding with a data file to a first memory address space of the disk drive, the first memory address space corresponding to a flash memory; and
storing the data file to a second memory address space of the disk drive, the second memory address space corresponding to a magnetic disk;
acquiring a flash confidence level from the disk drive, the flash confidence level corresponding to a number of write operations performed on the flash memory; and
remapping the first memory address space to correspond with the magnetic disk if the flash confidence level is below a specified threshold.

8. A method of operating a disk drive, comprising:
storing journaling information corresponding with a data file to a first memory address space of the disk drive, the first memory address space corresponding to a flash memory; and
storing the data file to a second memory address space of the disk drive, the second memory address space corresponding to a magnetic disk;
initiating a sleep mode;
copying the journaling information in the first memory address space corresponding to the flash memory to a third memory address space corresponding to the magnetic disk; and
powering down the disk drive.

9. A method of operating a disk drive, comprising:
storing journaling information corresponding with a data file to a first memory address space of the disk drive, the first memory address space corresponding to a flash memory; and
storing the data file to a second memory address space of the disk drive, the second memory address space corresponding to a magnetic disk; and
initiating a file recovery operation upon the detection of an improper shut down, the file recovery operation comprising:
examining the journaling information on the first memory address space corresponding to the flash memory for defects in a data structure of the journaling information; and
writing file information corresponding with the journaling information to the second memory address space corresponding to the magnetic disk if no defects in the data structure of the file journal are detected during the examination of the journaling information.

* * * * *